(12) United States Patent
Gouo (10) Patent No.: US 6,690,546 B2
(45) Date of Patent: Feb. 10, 2004

(54) HEAD SUSPENSION FOR A DISK DEVICE, DISK DEVICE AND HEAD IC TESTING METHOD

(75) Inventor: Akio Gouo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/748,918

(22) Filed: Dec. 27, 2000

(65) Prior Publication Data

US 2001/0036040 A1 Nov. 1, 2001

(30) Foreign Application Priority Data

Apr. 27, 2000 (JP) ...................................... 2000-128517

(51) Int. Cl.[7] ................................................. G11B 5/60
(52) U.S. Cl. .................................................... 360/244.1
(58) Field of Search ........................... 360/244.1, 244.2, 360/245.8

(56) References Cited

U.S. PATENT DOCUMENTS 5,422,764 A * 6/1995 McIlvanie ................ 360/97.01
5,864,446 A * 1/1999 Endo et al. ............... 360/244.6
6,173,485 B1 * 1/2001 Shiraishi et al. ......... 29/603.06

FOREIGN PATENT DOCUMENTS

JP 11-213364 8/1999

* cited by examiner

Primary Examiner—Robert S. Tupper
(74) Attorney, Agent, or Firm—Greer, Burns & Crain, Ltd.

(57) ABSTRACT

This invention relates to a head suspension with a head IC and makes it possible to simplify checking of the head IC and reduce the cost of the head suspension. A first connection terminal 21 that electrically connects to the head 4; a second connection terminal 22 that connects to external circuits; third and fourth connection terminals 23, 24 that electrically connect to the head IC 20, which processes the electrical signal from the head; a first conductive path 28 that connects the first connection terminal 21 with the third connection terminal 23; a second conductive path 26 that connects the second connection terminal 22 with the fourth connection terminal 24; and a measurement terminal 25 that is located between the second connection terminal 22 and fourth connection terminal 24 are formed on the head suspension 9. With this invention, contact of the probes for checking the head IC when the head IC has been installed before installing the head becomes easier.

8 Claims, 7 Drawing Sheets

HEAD SUSPENSION FOR A DISK DEVICE, DISK DEVICE AND HEAD IC TESTING METHOD

BACKGROUND OF THE INVENTION

1. Field of the Invention

This invention relates to a head suspension for supporting a head of a disk device, to a disk device which uses it, and to a testing method for a head IC.

2. Description of the Related Art

Disk devices for reading a disk storage medium using a head are widely used. For example, magnetic disk drives that are used as storage devices for computers comprise a magnetic disk, a spindle motor that rotates the magnetic disk, a magnetic head for reading from or writing to the magnetic disk, and a VCM actuator that positions the magnetic head at a track on the magnetic disk.

The storage density of these kinds of disk drives is greatly increasing, as well as is the density of tracks on the magnetic disk. It is especially possible to increase the density by using a MR (GMR, TMR) head as the magnetic head. Therefore, a high precision device is also desired for processing of the head signal.

In a magnetic disk device, the magnetic head is supported by a suspension. The suspension is attached to the carriage arm of a VCM actuator. The suspension has springiness and functions such that the magnetic head follows the surface of the magnetic disk. The magnetic head performs input/output of an analog signal, so it is equipped with a head IC for processing the analog signal. The head IC comprises a preamp for amplifying the read signal of the magnetic head, and a writing amp for supplying writing current to the magnetic head.

Normally, this head IC is attached to the carriage arm located at the rear of the suspension. Moreover, the head IC is connected to the magnetic head by lead wires on the suspension. However, in the case of a weak magnetic head output, as in the case of the recent MR heads, it is not possible to ignore the effect of noise that mixes into the long lead wire.

In addition, when the lead wire is long, the rising time and falling time of the pulse signal (writing pulse) both become long, so there is a problem in that it becomes difficult to transfer data at high speed. Therefore, it is proposed to place the head IC chip on the suspension in order to shorten the distance between the magnetic head and the head IC.

With that kind of construction, it is necessary to test each suspension. Conventionally, a slider on which the head IC and magnetic head are located is attached to the suspension to form a HGA (head gimbal assembly), then this HGA is made to float above the disk medium and by the head magnetically reading/writing, the operation of the head IC and the connection status are checked.

However, with the prior method, the head and head IC of the HGA unit are checked together so when one is determined to be faulty that entire HGA is considered faulty. Therefore, there is a problem that yield decreases and it is difficult to keep costs down.

SUMMARY OF THE INVENTION

The objective of the invention is to provide a head suspension, a disk device and a testing method for testing the head IC installed in the suspension.

Another objective of the invention is to provide a head suspension, a disk device and a testing method for simply testing the head IC installed in the suspension.

A further objective of the invention is to provide a head suspension, a disk device and a testing method for testing the head IC that improves the yield of the head assembly.

In order to accomplish these objectives, the head suspension of this invention comprises: a first connection terminal that electrically connects to a head; a second connection terminal that connects to external circuits; third and fourth connection terminals that electrically connect to a head IC for processing an electrical signal from the head; a first conductive path that connects the first connection terminal with the third connection terminal; a second conductive path that connects the second connection terminal with the fourth connection terminal; and a measurement terminal that is located between the second connection terminal and fourth connection terminal of the second conductive path, and which is for measuring the head IC.

Moreover, the disk device of this invention comprises: a head for at least reading a disk medium, a head IC that processes the electrical signal from the head, a head suspension which contains the head IC and which supports the head, and an actuator that supports the head suspension and moves the head with respect to the disk medium; and where the head suspension comprises: a first connection terminal for electrically connecting to the head, a second connection terminal for connecting to external circuits, third and fourth connection terminals for electrically connecting to the head IC, a first conductive path that connects the first and third connection terminals, a second conductive path that connects the second and fourth connection terminals, and a measurement terminal that is located between the second connection terminal and fourth connection terminal of the second conductive path, and which is for measuring the head IC.

Furthermore, the testing method for head IC of this invention comprises: a step of installing a head IC for processing the electric signal from the head, and a step of placing a probe on the head suspension terminal to test the electric characteristics of the head IC.

In this invention, first a head IC is installing on the head suspension and the head IC is checked before installing the head. By doing this, it is possible to check the operation and connection of the head IC itself, and to divide the head assembly into good or faulty parts before installing the head. Therefore, it is possible to increase the yield and to keep down costs of the head assembly.

Second, in order to check the head IC that is installed on the suspension, it is necessary to place a measurement probe on the terminal. Theoretically, by placing the probe on the first and second terminals instead of the third and fourth terminals installed on the head IC, it is possible to check the head IC. However, the second terminal for external connection is located in a position that is easy for external connection and it is not easy to place a probe on it. Therefore, in this invention, a measurement terminal is located between the second and fourth connection terminals. This makes contact with the probe easy and makes it possible to quickly check the head IC.

Moreover, in the head suspension of this invention, the measurement terminal and the first connection terminal are located such that they are on the same plane as the suspension, and this makes it even easier for contact with a pair of probes, which makes it possible to check the head IC even more quickly.

In addition, in the head suspension of this invention, the first, second, third and fourth connection terminals, the first and second conductive paths, and the measurement terminal are formed using a thin-film pattern on the base of the suspension, so the measurement terminal can be formed with the same process as the other terminals and conductive paths, making construction more simple.

Furthermore, in the head suspension of this invention, flexible cable is used around the base of the head suspension, which is provided the first, second, third and fourth connection terminal, the first and second conductive paths and the measurement terminal so it is possible to separate the base and the cable.

DESCRIPTION OF THE PREFERRED EMBODIMENTS

The embodiments of this invention will be explained below in the order: disk device, head suspension and testing method, and other embodiments.

Disk Device

Figure 1:
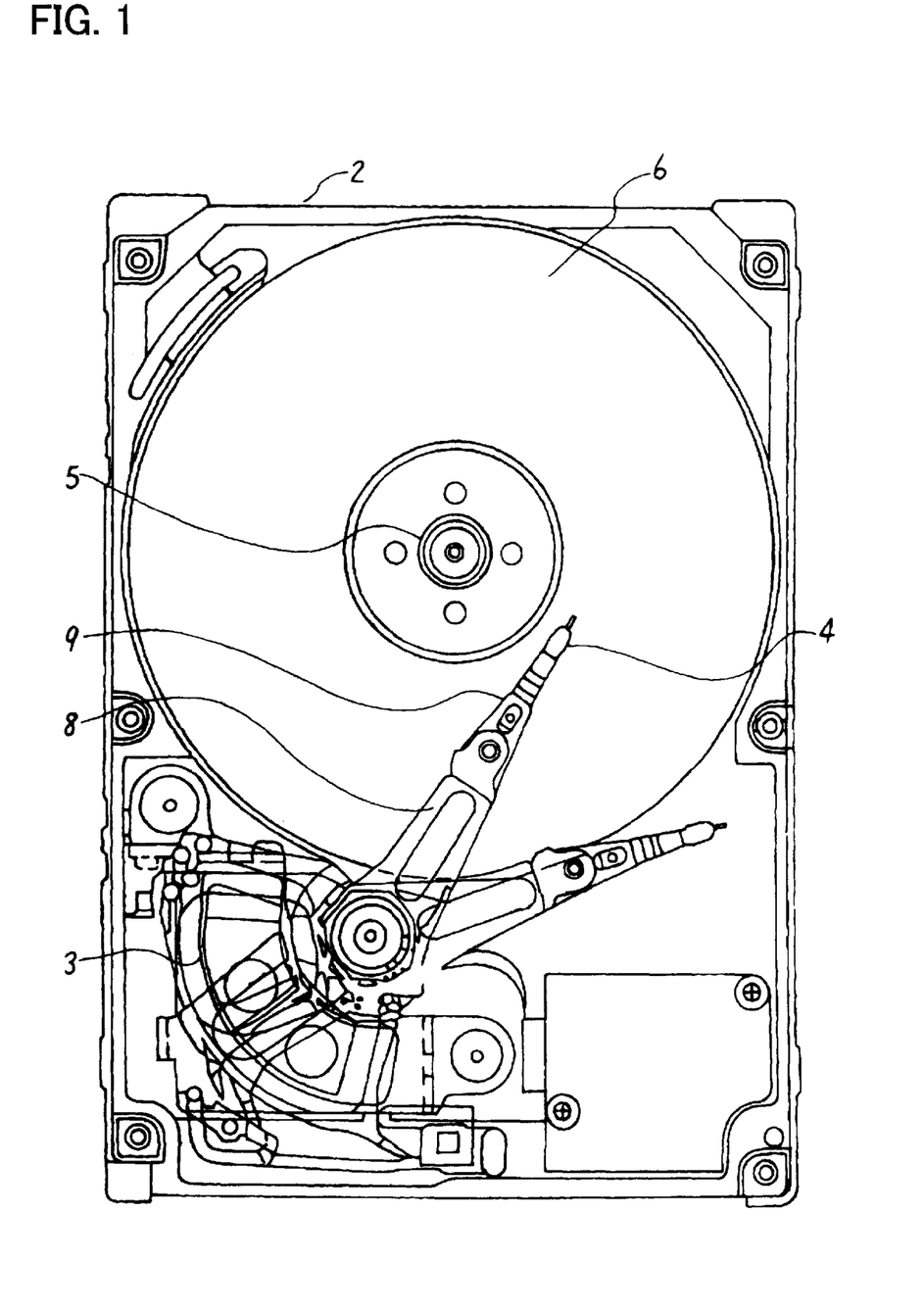
FIG. 1 is a top view of the disk device of an embodiment of the invention.
Figure 2:
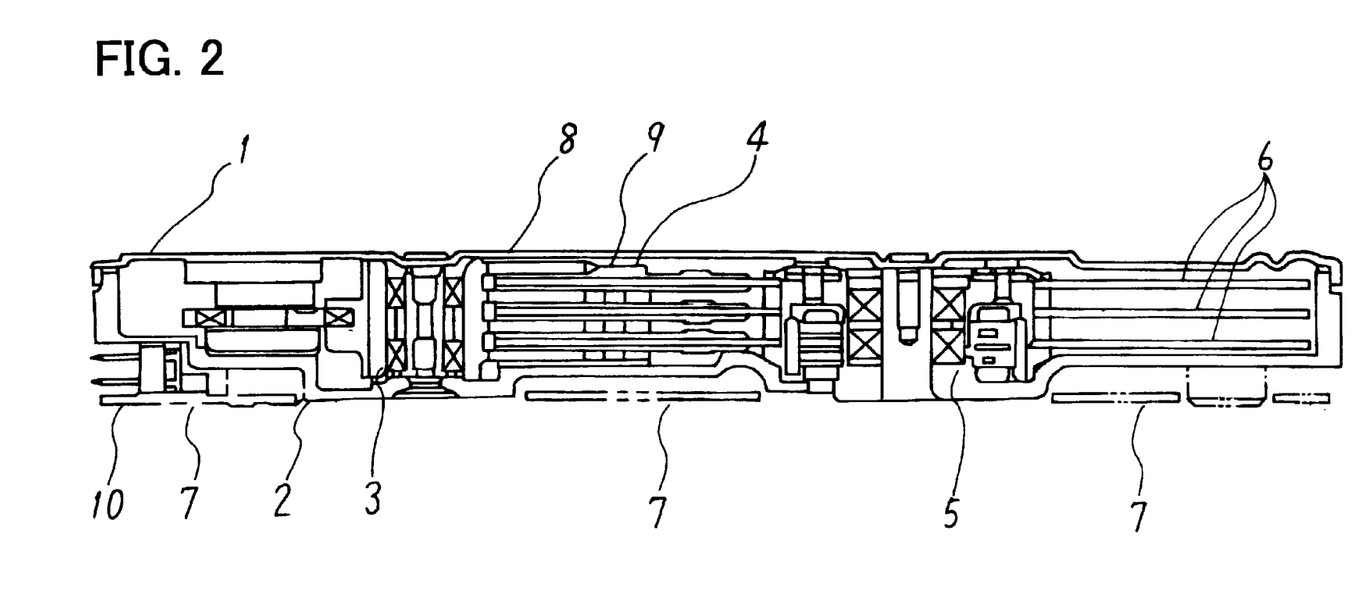
FIG. 2 is a cross-sectional view of the disk device in FIG. 1.
Figure 3:
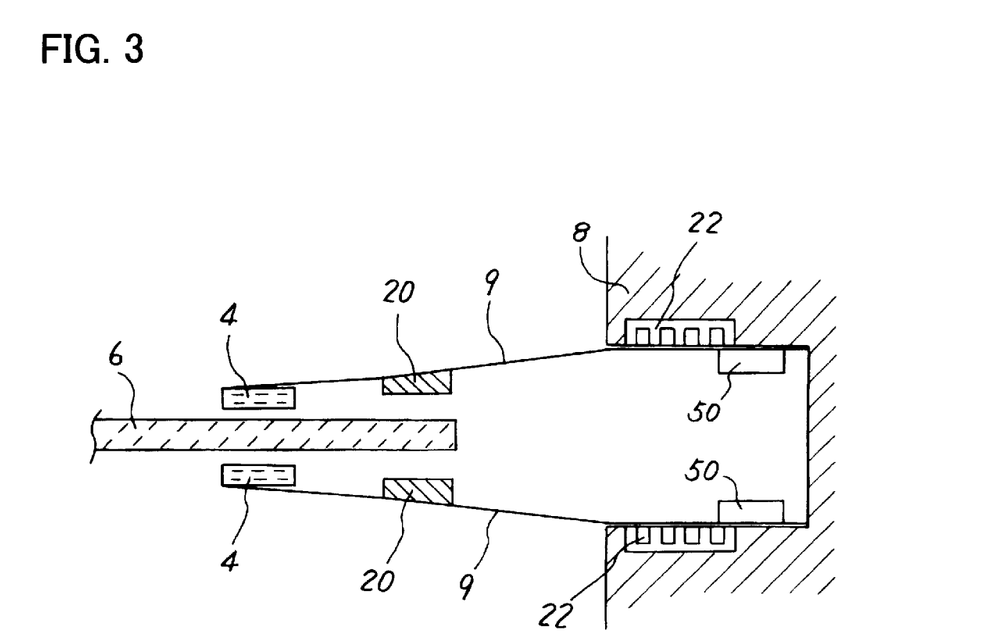
FIG. 3 is an enlarged view of the main parts of the disk device in FIG. 2.

FIG. 1 is a top view of the disk device of an embodiment of the invention, FIG. 2 is a cross-sectional view of that disk device, and FIG. 3 is an enlarged view of the part in FIG. 2. In this example, a hard disk drive is used as the disk device.

As shown in FIG. 1 and FIG. 2, the magnetic disk 6 comprises a magnetic recording layer formed on a base plate (disk). The magnetic disk 6 has a diameter of 3.5 inches, and there are three disks installed inside the drive. A spindle motor 5 supports the magnetic disk 6 and rotates it. A magnetic head (slider) 4 is installed on the actuator. The actuator comprises a rotating-type VCM (voice coil motor) 3, a carriage arm 8 and suspension 9. The magnetic head 4 is installed on the tip of the suspension 9.

The magnetic head 4 reads data from or writes data to the magnetic disk 6. The magnetic head 4 comprises a slider that has a MR element (reproduction element) and writing element. The actuator 3 positions the magnetic head 4 at a desired track on the magnetic disk 6. The actuator 3 and spindle motor 5 are installed to the drive base 2. A cover 1 covers the drive base 2 and separates the inside of the drive from the out side. A printed-circuit board 7 is located below the drive base 2 and it contains the drive control circuit. A connector 10 is located below the drive base 2 and it connects the control circuit with the outside.

As shown in the enlarged view of FIG. 3, the magnetic head 4 and head IC chip 20 are placed on one side of the suspension 9. The rear end of the suspension 9 is attached to the carriage arm 8 with a pin 50. An external-connection terminal 22 (described later using FIG. 5) on the suspension 9 is guided by the surface on the side of the carriage arm 8. Therefore, the suspension 9 is fastened to the carriage arm 8.

In addition, the external-connection terminal 22 is connected to a flexible cable (not shown in the figure) in order to connect with external circuits. This flexible cable is located on the side of the carriage arm 8. Moreover, since the external-connection terminal 22 is located on the side of the arm 8, it can be connected without the flexible cable having to bend.

Figure 4:
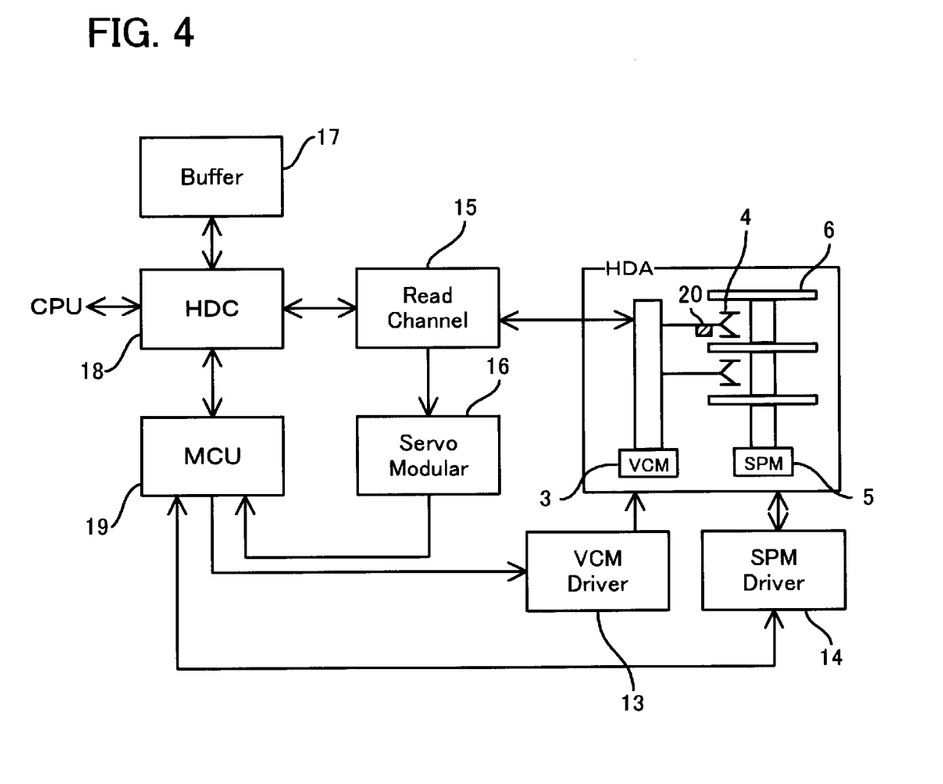
FIG. 4 is a block diagram of the disk device in FIG. 1.

FIG. 4 is a block diagram of the control circuit on the printed-circuit board 7 and inside the drive. An HDC (hard disk controller) 18 generates control signals inside the magnetic disk device for controlling the interface with the CPU for receiving commands or data from the host CPU, and for controlling the read/write format on the magnetic disk medium. A buffer 17 is used for temporarily storing write data from the host CPU to be written to the magnetic disk medium, or for temporarily storing read data that is read from the magnetic disk medium.

A MCU (micro controller) 19 comprises a microprocessor (MPU), memory, DA converter, and AD converter. The MCU (called MPU below) 19 performs servo control (positioning control) for positioning the magnetic head. The MPU 19 executes a program stored in memory, recognizes the position signal from the servo demodulation circuit 16, and calculates the control amount of the VCM control current of the actuator for positioning. Furthermore, the MPU 19 controls the driving current of the SPM drive circuit 14.

The VCM drive circuit 13 comprises a power amp for causing driving current to flow to the VCM (voice coil motor). The SPM drive circuit 14 comprises a power amp for causing driving current to flow to the spindle motor (SPM) 5 that rotates the magnetic disk 6.

A read channel 15 is a circuit for performing reading or writing. The read channel 15 comprises a modulation circuit for writing write data from the host CPU to the magnetic disk medium 6, a parallel-to-serial conversion circuit, a demodulation circuit for reading data from the magnetic disk medium 6, and a serial-to-parallel conversion circuit. A servo demodulation circuit 16 is a circuit for demodulating a servo pattern that is written on the magnetic disk medium, and it outputs a position signal to the MPU 19.

Furthermore, inside the drive HDA, there is a head IC 20 (see FIG. 3) which comprises a writing amp, that supplies writing current to the magnetic head 4, and a preamp, that amplifies the reading voltage from the magnetic head 4.

Here, an example of a magnetic disk device is explained as the disk device, however, it is also possible to use an optical disk device such as a DVD or MO. Also, here a device that is capable of reading and writing was used, however it is also possible to use a read-only device.

Head Suspension and Testing Method

Figure 5:
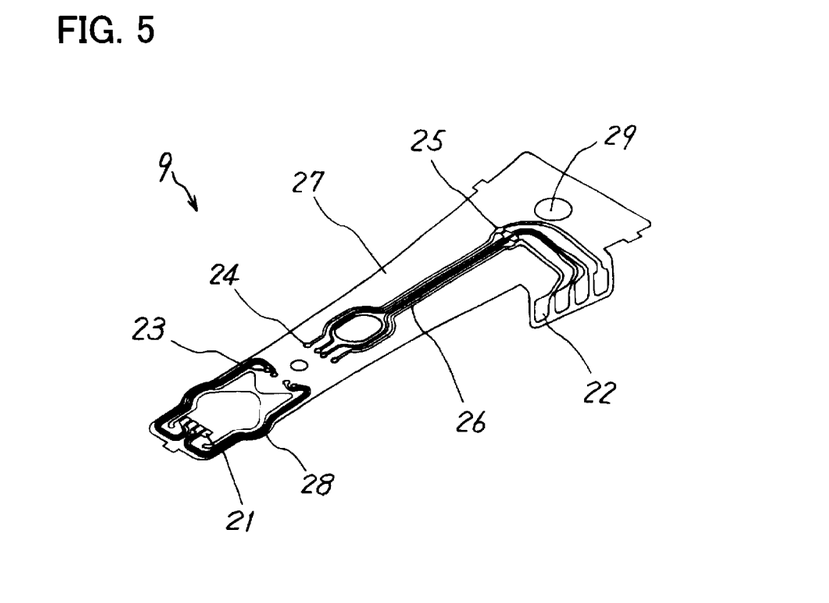
FIG. 5 is a pictorial view of the head suspension of an embodiment of the invention.

FIG. 5 is a pictorial view of the head suspension of an embodiment of the invention, and it shows a magnetic head suspension 9.

The suspension base 27 is formed from stainless steel or the like. There is a thin film pattern that is formed from the insulation layer on the base 27. This thin film pattern comprises: a first connection terminal 21 for electrically connecting with the magnetic head 4; a second connection terminal 22 for connecting to external circuits; third and fourth connection terminals 23, 24 for electrically connecting to the head IC that processes the electrical signal from the magnetic head; a first conductive path 28 that connects the first connection terminal 21 and the third connection terminal; a second conductive path 26 that connects the second connection terminal 22 and the fourth connection terminal 24; and a measurement terminal 25, that is located between the second terminal 22 and fourth connection terminal 24 on the second conductive path 26, and is for measuring the head IC 20.

The sections of the base 27 except these terminals 21, 22, 23, 24 and 25 are covered by a protective layer. Also, there is hole 29 formed in the suspension 9 through which the pin 50 shown in FIG. 3 is inserted.

Figure 6:
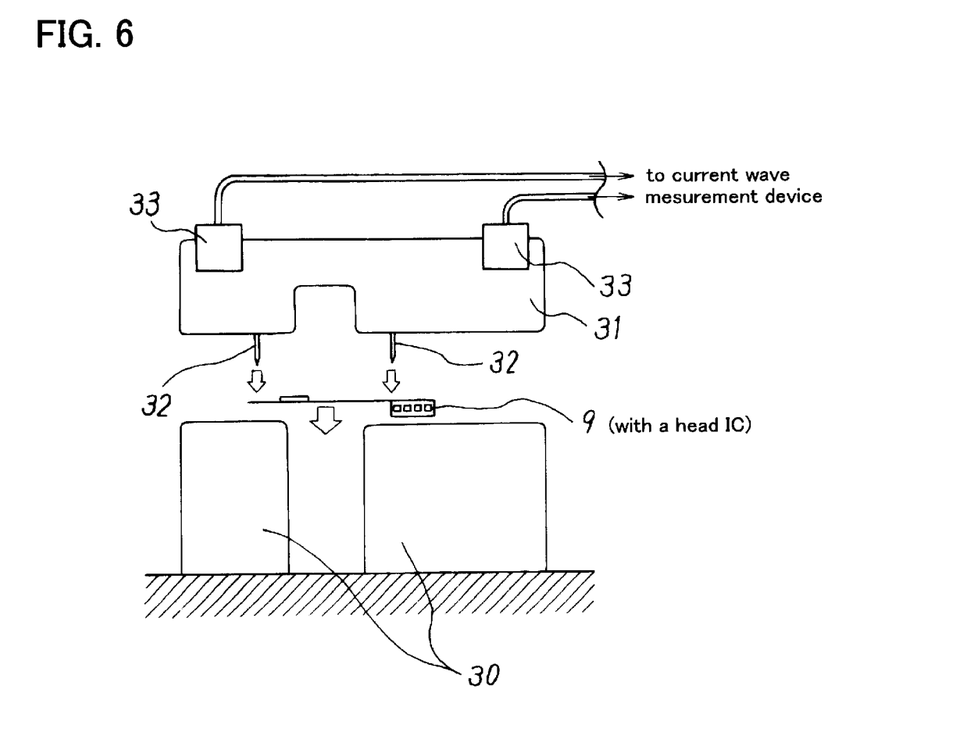
FIG. 6 is a schematic view of the head IC checking device of an embodiment of the invention.
Figure 7:
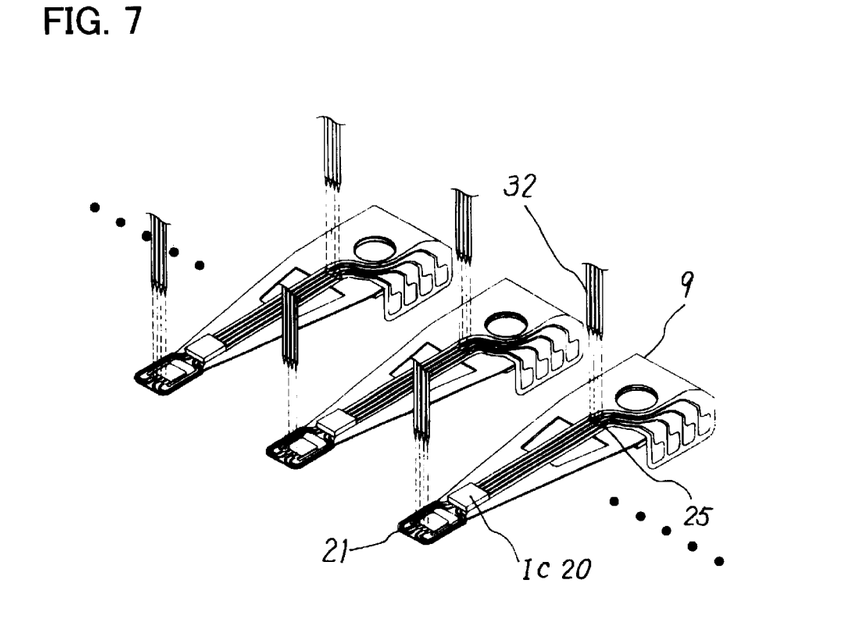
FIG. 7 is a drawing explaining the head IC checking method of an embodiment of the invention.

FIG. 6 is a schematic diagram of the testing device of an embodiment of the invention, and FIG. 7 is a drawing explaining the testing method.

As shown in FIG. 6, the testing device comprises a receiving cradle 30 for receiving the suspension 9, a measurement head 31 with a pair of probes 32, and a connector 33 for connecting to a current waveform measurement device (not shown in the figure).

The testing method will be explained. First, a head IC chip 20 is placed on the suspension 9 shown in FIG. 5. For example, the head IC chip 20 is attached and connected to the third and fourth connection terminals 23, 24 on the suspension 9. In this way, as shown in FIG. 7, a plurality of suspensions 9 with the head IC chips 20 are placed in the receiving cradle 30 shown in FIG. 6.

As shown in FIG. 7, the measurement head 31 is lowered, a pair of probes 32 are brought into contact with the first head connection terminal 21 and the IC check terminal 25 on the suspension 9, and measurement current from the probes 32 is output to the a current waveform measurement device (not shown in the figure).

The head IC chip 20 comprises at least a reading amp and writing amp. A representative example could be TLS26A803 and TLS26A801 (model name) amps manufactured by TI. It is possible to check the operating state of these head IC chip amps, the diode characteristics (VI characteristics) and the connection status.

In this way, since the head IC 20 is placed on the head suspension 9 and checked before installing the head 4, it is possible to check the operation and connection of the head IC 20 itself, and thus it is possible to divide the head assembly into good and faulty parts before installing the head 4. Therefore, it is possible to increase yield while keeping down costs of the head assembly.

Moreover, in order to check the head IC 20 on the suspension 9, it is necessary for the measurement probes 32 to come in contact with the terminals. It is possible to check the head IC 20 by bringing the probes 32 into contact with the first terminal 21 and second terminal 25 instead of the third and fourth terminals on the head IC. However, the second connection terminal 22 for external connection is located in a position that is easy for external connection (to the side of the suspension 9 in FIG. 5) and it is not easy to place a probe 32 on it. Therefore, in this invention, a measurement terminal 25 is located between the second and fourth connection terminals 22, 24. This makes contact with the probe 32 easy and makes it possible to quickly check the head IC.

Furthermore in the head suspension of this invention, the measurement terminal 25 and the first connection terminal are on the same plane of the suspension 9. In this way it is even easier for making contact with the pair of probes 32, which makes it possible to check the head IC 20 even more quickly.

In addition, in the head suspension 9 shown in FIG. 5, the first, second, third and fourth connection terminals 21, 23, 24, 22, the first and second conductive paths 26, 28, and the measurement terminal 25 are formed using a thin-film pattern on the suspension base 27. Therefore, the measurement terminal 25 can be formed with the same process as the other terminals and conductive paths, making construction more simple.

Other Embodiments

Figure 8:
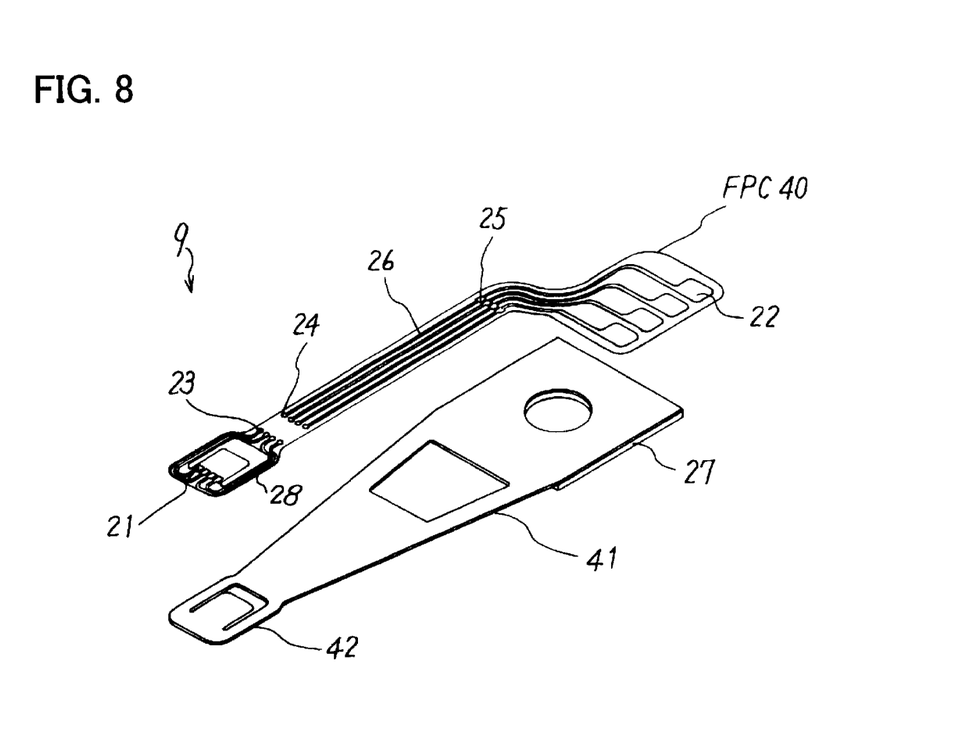
FIG. 8 is a pictorial drawing of the head suspension of another embodiment of the invention.

FIG. 8 is a pictorial view of a head suspension of another embodiment of the invention, and parts that are identical to parts shown in FIG. 5 are indicated with the same symbol.

As shown in FIG. 8, the head suspension 9 comprises a head suspension base 27 and flexible cable 40 with a first, second, third and fourth connection terminals 22, 23, 24, 25, first and second conductive paths 26, 28, and a measurement terminal 25.

A load beam 41 and gimbal 42 are formed on the base 27. This example, shows the application of a suspension 9 with a separate base 27 and cable 40.

Figure 9:
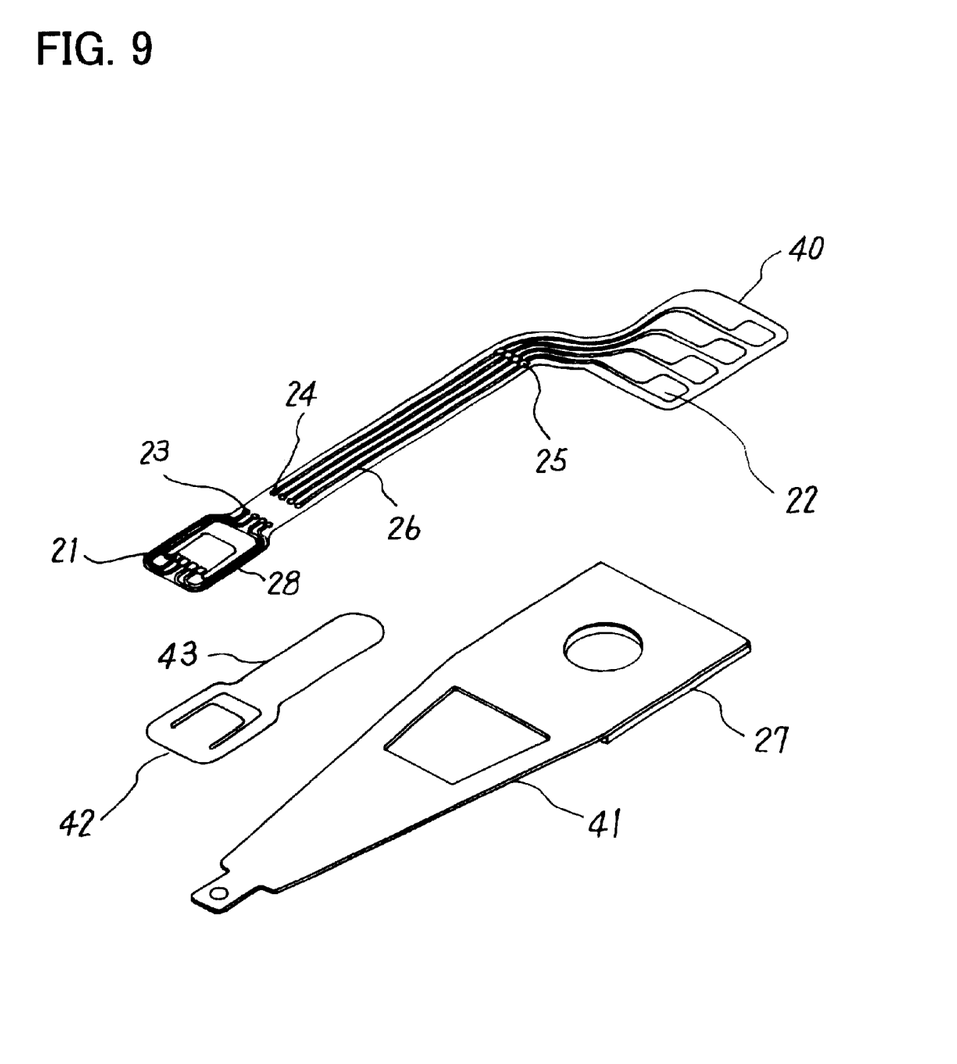
FIG. 9 is a pictorial drawing of the head suspension of yet another embodiment of the invention.

FIG. 9 is a pictorial view of a head suspension of yet another embodiment of the invention, and parts that are identical to parts shown in FIG. 5 and FIG. 8 are indicated with the same symbol.

As shown in FIG. 9, the head suspension 9 comprises a head suspension base 27 and a flexible cable 40 with a first, second, third and fourth connection terminals 22, 23, 24, 25, first and second conductive paths 26, 28, and a measurement terminal 25.

A load beam 41 is formed in the base 27 and a flexure 43 having a gimbal 42 is attached to the base 27. This example also shows the application of a suspension 9 with a separate base 27 and cable 40.

In addition to embodiments described above, the invention can be changed as follows.

(1) An example is given of placing the head IC on one side of the suspension, however it is possible to place the head IC on both sides.

(2) Instead of a magnetic head, the invention can be applied to a suspension with an optical head or magneto-optical head.

The preferred embodiments of the present invention have been explained, however the invention is not limited to these embodiments and can be embodied in various forms within the scope of the present invention.

As described above, this invention has the following effect.

First, the head IC is placed on the head suspension and checked before installing the head. By doing so, it is possible to check the operation and connection of the head IC itself, and thus it is possible to divide the head assembly into good and faulty parts before installing the head. Therefore, it is possible to increase yield while keeping down costs of the head assembly.

Second, a measurement terminal is located between the second and fourth connection terminals in order to check the head IC on the suspension. This makes contact with the probe easy, and makes it possible to quickly check the head IC.

What is claimed is:

1. A head suspension of a disk device that supports a head for at least reading a disk medium and comprising:
   a first connection terminal that electrically connects to said head;
   a second connection terminal that connects to external circuits;
   third and fourth connection terminals that electrically connect to a head IC, which processes an electrical signal from said head;
   a first conductive path that connects said first connection terminal with said third connection terminal;
   a second conductive path that connects said second connection terminal with said fourth connection terminal and
   a measurement terminal that is located between said second connection terminal and said fourth connection terminal of said second conductive path, and which is for measuring said head IC,
   wherein said measurement terminals and said first connection terminals are located on a first plane of said head suspension, and
   wherein said second connection terminal is located on a second plane of said head suspension that is substantially perpendicular to the first plane.

2. The head suspension of claim 1, wherein said first, second, third and fourth connection terminals, said first and second conductive paths, and said measurement terminal are formed using a thin-film pattern on the base of said suspension.

3. The head suspension of claim 1, further comprising:
   a base for said head suspension; and
   a flexible cable on which said first, second, third and fourth connection terminals, said first and second conductive paths, and said measurement terminal are formed.

4. The head suspension of claim 1 wherein said first connection terminal is electrically connected to a magnetic head.

5. A disk device comprising:
   a head for at least reading a disk medium;
   a head IC that processes an electrical signal from said head;
   a head suspension which supports said head and which contains said head IC; and
   an actuator that supports said head suspension and moves said head with respect to said disk medium; wherein said head suspension comprises:
      a first connection terminal for electrically connecting to said head;
      a second connection terminal for connecting to external circuits;
      third and fourth connection terminals for electrically connecting to said head IC;
      a first conductive path that connects said first and third connection terminals;
      a second conductive path that connects said second and fourth connection terminals; and
      a measurement terminal that is located between said second connection terminal and said fourth connection terminal of said second conductive path, and which is for measuring said head IC,
      wherein said measurement terminals and said first connection terminals are located on a first plane of said head suspension, wherein said second connection terminal is located on a second plane of said head suspension that is substantially perpendicular to the first plane.

6. The disk device of claim 5, wherein said first, second, third and fourth connection terminals, said first and second conductive paths, and said measurement terminal are formed using a thin-film pattern on the base of said suspension.

7. The disk device of claim 5, further comprising:
   a base for said head suspension; and
   a flexible cable on which said first, second, third and fourth connection terminals, said first and second conductive paths, and said measurement terminal are formed.

8. The disk device of claim 5 wherein said head comprises a magnetic head.

* * * * *

UNITED STATES PATENT AND TRADEMARK OFFICE
CERTIFICATE OF CORRECTION

PATENT NO. : 6,690,546 B2
DATED : February 10, 2004
INVENTOR(S) : Akio Gouo

It is certified that error appears in the above-identified patent and that said Letters Patent is hereby corrected as shown below:

<u>Title page,</u>
Item [56], References Cited, U.S. PATENT DOCUMENTS, please insert the following references:

| | | | | |
|---|---|---|---|---|
| -- 6,202,288 | * | 3/2001 | Shiraishi et al. | 29/603.03 |
| 6,134,084 | * | 10/2000 | Ohwe et al. | 360/244.1 |
| 6,351,347 | * | 2/2002 | Ohno et al. | 360/244.1 |
| 6,369,985 | * | 4/2002 | Gouo et al. | 360/244.1 |
| 6,084,746 | * | 7/2000 | Shiraishi et al. | 360/244.1 |
| 6,388,840 | * | 5/2002 | Ohwe, Takeshi | 360/244.1 |
| 6,181,520 | * | 1/2001 | Fukuda, Katsuyuki | 360/234.4 |
| 6,266,213 | * | 7/2001 | Hiraoka, Shinji | 360/244.1 |
| 6,339,519 | * | 1/2002 | Nomura et al. | 360/244.1 -- |

Signed and Sealed this

Seventeenth Day of August, 2004

JON W. DUDAS
*Acting Director of the United States Patent and Trademark Office*